US008744733B2

(12) United States Patent
Sano

(10) Patent No.: US 8,744,733 B2
(45) Date of Patent: Jun. 3, 2014

(54) CONTROL APPARATUS FOR INTERNAL COMBUSTION ENGINE

(75) Inventor: Takeshi Sano, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 240 days.

(21) Appl. No.: 13/390,823

(22) PCT Filed: Sep. 24, 2009

(86) PCT No.: PCT/JP2009/066518
§ 371 (c)(1), (2), (4) Date: Feb. 16, 2012

(87) PCT Pub. No.: WO2011/036743
PCT Pub. Date: Mar. 31, 2011

(65) Prior Publication Data

US 2012/0173127 A1 Jul. 5, 2012

(51) Int. Cl.
*G06F 19/00* (2011.01)

(52) U.S. Cl.
USPC ............................ 701/113; 123/434; 123/435

(58) Field of Classification Search
CPC ........................... F02D 41/04; F02N 2200/021
USPC .......... 701/113, 114; 123/434, 435, 673, 674, 123/478, 480, 491, 494
See application file for complete search history.

(56) References Cited

U.S. PATENT DOCUMENTS

| | | | | |
|---|---|---|---|---|
| 5,611,311 | A | 3/1997 | Tomisawa | |
| 6,863,050 | B2 * | 3/2005 | Iizuka et al. | 123/345 |
| 7,021,286 | B2 * | 4/2006 | Yoshino et al. | 123/406.29 |
| 7,182,066 | B2 * | 2/2007 | Goya et al. | 123/435 |
| 7,347,185 | B2 * | 3/2008 | Moriya et al. | 123/435 |
| 2006/0142930 | A1 | 6/2006 | Okubo et al. | |
| 2012/0004821 | A1 * | 1/2012 | Sano et al. | 701/101 |
| 2012/0160217 | A1 * | 6/2012 | Ashizawa | 123/48 D |

FOREIGN PATENT DOCUMENTS

| | | | |
|---|---|---|---|
| JP | 08-028338 | A | 1/1996 |
| JP | 11-082148 | A | 3/1999 |
| JP | 2000-064890 | A | 2/2000 |
| JP | 2005-120905 | A | 5/2005 |
| JP | 2005-194892 | A | 7/2005 |
| JP | 2006-183532 | A | 7/2006 |
| JP | 2007-291955 | A | 11/2007 |
| JP | 2008-196417 | A | 8/2008 |

* cited by examiner

*Primary Examiner* — John Kwon
(74) *Attorney, Agent, or Firm* — Sughrue Mion, PLLC

(57) ABSTRACT

An object of this invention is to promptly detect a crank angle based on in-cylinder pressures and easily compensate for a detection error by processing that has a low computational load. An ECU 50 calculates an in-cylinder pressure ratio ($P_{n+1}/P_n$) based on in-cylinder pressures $P_n$ and $P_{n+1}$ at two crank angles separated by a predetermined angle $\Delta\theta$. The ECU 50 includes map data that represents relations between volume ratio parameters ($V_n^{\kappa}/V_{n+1}^{\kappa}$) calculated using in-cylinder volumes $V_n$ and $V_{n+1}$ at the crank angles, and the crank angles. Therefore, when cranking, a crank angle can be detected based on the in-cylinder pressure ratio and the map data earlier than a conventional cylinder discrimination operation. Gains included in the in-cylinder pressures $P_n$ and $P_{n+1}$ can be removed by dividing the two pressures, and exponential operations and the like can be eliminated by using the map data to thus suppress the computational load.

6 Claims, 5 Drawing Sheets

CONTROL APPARATUS FOR INTERNAL COMBUSTION ENGINE

CROSS REFERENCE TO RELATED APPLICATION

This application is a National Stage of International Application No. PCT/JP2009/066518 filed Sep. 24, 2009, the contents of all of which are incorporated herein by reference in their entirety.

TECHNICAL FIELD

The present invention relates to a control apparatus for an internal combustion engine, and more particularly to a control apparatus for an internal combustion engine that is configured to detect a crank angle based on an in-cylinder pressure.

BACKGROUND ART

An engine that is configured to detect an absolute crank angle (piston position) using a crank angle sensor and a cam angle sensor is known as a conventional internal combustion engine. Specifically, a signal output from the crank angle sensor in accordance with rotation of the crankshaft and a signal output from the cam angle sensor in accordance with rotation of the camshaft are compared, and an absolute crank angle is determined by taking a time point at which a predetermined combination of signal patterns appears as a criterion. According to this method, at startup of the internal combustion engine (at the time of cranking), during a period until the crank angle is determined, more specifically, during a period until the predetermined combination of signal patterns appears, it is necessary for the crankshaft to rotate from approximately 180 to 360°. At the time point at which the crank angle is determined, a cylinder that first enters a compression stroke is distinguished from other cylinders, and fuel injection to the cylinder in question is started.

However, there is a demand to complete cranking in as short a time as possible at startup, to thereby realize favorable startability and suppress power consumption of the battery. Therefore, according to the conventional technology as disclosed, for example, in Patent Literature 1 (Japanese Patent Laid-Open No. 2008-196417), a configuration is adopted that, in order to begin fuel injection at startup earlier than in the above described method, distinguishes a cylinder that is in a compression stroke based on in-cylinder pressures. According to this conventional technology, a cylinder that is in a compression stroke is distinguished based on a pressure difference (ΔP) between in-cylinder pressures at two time points that are separated by a predetermined time period and an amount of change (dP/dt) in the in-cylinder pressure per unit of time.

In addition, as other conventional technology, as disclosed in Patent Literature 2 (Japanese Patent Laid-Open No. 2005-194892), a device is known that is configured to perform cylinder discrimination based on an amount of change (dP/dθ) in an in-cylinder pressure per unit of crank angle. Further, as disclosed in Patent Literature 3 (Japanese Patent Laid-Open No. 2000-64890), a method is known that performs cylinder discrimination at startup using an absolute value of an in-cylinder pressure, and as disclosed in Patent Literature 4 (Japanese Patent Laid-Open No. 2007-291955) a method is also known that determines a crank angle at startup by utilizing a fact that a relation $PV^{\kappa}$=constant is established in a cylinder.

CITATION LIST

Patent Literature

Patent Literature 1: Japanese Patent Laid-Open No. 2008-196417

Patent Literature 2: Japanese Patent Laid-Open No. 2005-194892

Patent Literature 3: Japanese Patent Laid-Open No. 2000-64890

Patent Literature 4: Japanese Patent Laid-Open No. 2007-291955

SUMMARY OF INVENTION

Technical Problem

According to the conventional technology disclosed in Patent Literature 1 to 3 as described above, configurations are adopted that use an absolute value of an in-cylinder pressure or use various parameters (ΔP, dP/dt, dP/dθ) when performing cylinder discrimination or detecting a crank angle at startup. However, since an error is liable to occur in a pressure detected by an in-cylinder pressure sensor, there is the problem that cylinder discrimination and crank angle detection can not be accurately performed according to the aforementioned kinds of conventional technology. This point is described in further detail below.

In general, when the output of an in-cylinder pressure sensor is taken as "P", a true pressure Pt that should be detected can be expressed as shown in the following equation (1) using a gain "a" and an offset "b" of appropriate values.

$$Pt=a\times P+b \tag{1}$$

However, the gain a is liable to fluctuate due to deterioration of the sensor or individual differences among sensors and the like, and the offset b is liable to fluctuate due to thermal strain of the sensor and the like. More specifically, an error occurs in a detected pressure due to fluctuations of the parameters a and b. As a result, with respect to the methods that use an absolute value of an in-cylinder pressure or the parameters (ΔP, dP/dt, dP/dθ) as described above, for example, a situation as shown in FIG. 6 and FIG. 7 may arise due to the sensor deteriorating and the gain a decreasing. FIG. 6 is a characteristics diagram that illustrates output changes in a case where the gain of an in-cylinder pressure sensor decreases, and FIG. 7 is a characteristics diagram that illustrates changes in the parameters (ΔP, dP/dθ) in a case where the gain decreases. As shown in FIGS. 6 and 7, when the gain a decreases, the peak value of an in-cylinder pressure or a parameter during a compression stroke no longer exceeds a threshold value for cylinder discrimination, and there is the possibility that cylinder discrimination will not be performed normally. Furthermore, although it is comparatively easy to correct the offset b, it is difficult to correct the gain a.

Therefore, according to the conventional technology described in Patent Literature 1 to 3, there is the problem that fluctuations in the gain a can not be dealt with adequately, and consequently cylinder discrimination or detection of a crank angle are liable to be inaccurate. Furthermore, at startup, since a fuel injection amount (injection time period) changes significantly in accordance with the outside air temperature and water temperature and the like, if these processes are inaccurate, the fuel injection timing can not be set accurately and it is difficult to improve startability and exhaust emissions at startup.

According to the conventional technology described in Patent Literature 4, based on in-cylinder pressures P1 and P5 at two time points that are separated by a predetermined time period, in-cylinder volume V1 and V5 at the two time points, and a specific heat ratio κ, a crank angle is determined at which the equation $P1 \cdot V1^{\kappa} - P5 \cdot V5^{\kappa} = 0$ is established. However, according to this conventional technology, in a predetermined angle section, processing is repeatedly executed to determine whether or not the above equation is established. More specifically, according to the conventional technology described in Patent Literature 4, since processing that has a high computational load including exponential operations is repeated many times for each cylinder, there is the problem that the computational load of the control apparatus increases and it is necessary to provide a control apparatus with a high performance that corresponds to the high computational load.

The present invention has been conceived to solve the above mentioned problems, and an object of the present invention is to provide a control apparatus for an internal combustion engine that can promptly detect a crank angle based on in-cylinder pressures and easily compensate for a detection error by processing that has a low computational load.

Means for Solving the Problem

A first aspect of the present invention is a control apparatus for an internal combustion engine, comprising:

- an in-cylinder pressure sensor that is provided in at least one cylinder of an internal combustion engine, and that detects an in-cylinder pressure of the cylinder;
- rotation angle detection means that detects an angle to which a crankshaft of the internal combustion engine is rotated;
- pressure ratio calculation means that detects a first in-cylinder pressure that is an in-cylinder pressure at a time that the crankshaft is at an arbitrary crank angle and a second in-cylinder pressure that is an in-cylinder pressure when the crankshaft is at a crank angle reached by rotating by a predetermined angle from the arbitrary crank angle, and calculates a ratio between the first and second in-cylinder pressures;
- data means that is previously set by expressing a relation between the ratio of in-cylinder pressures and the crank angle in a data format; and
- crank angle detection means that detects an angle value of the arbitrary crank angle based on at least the ratio of in-cylinder pressures and the data means.

In a second aspect of the present invention, the data means is means that, utilizing a fact that a volume ratio parameter $(V_n^{\kappa}/V_{n+1}^{\kappa})$ or $(V_{n+1}^{\kappa}/V_n^{\kappa})$ that is calculated based on an in-cylinder volume $V_n$ at the arbitrary crank angle, an in-cylinder volume $V_{n+1}$ at the crank angle reached by rotating by a predetermined angle from the arbitrary crank angle, and a specific heat ratio κ is equal to the ratio of in-cylinder pressures, expresses a relation between the volume ratio parameter and the crank angle in a data format.

In a third aspect of the present invention, the crank angle detection means is configured to perform detection processing with respect to the crank angle by utilizing a cylinder that is in a totally-closed period that extends from a time that an intake valve closes until an exhaust valve opens.

In a fourth aspect of the present invention, the crank angle detection means is configured to determine that the cylinder is in the totally-closed period when the ratio of in-cylinder pressures exceeds a predetermined standard value.

In a fifth aspect of the present invention, the crank angle detection means is configured to perform detection processing with respect to the crank angle based on the ratio of in-cylinder pressures, the data means, and an increasing or decreasing trend of the in-cylinder pressure at a time point at which the first or second in-cylinder pressure is detected.

In a sixth aspect of the present invention, the control apparatus for an internal combustion engine further comprising offset removal means that removes an offset included in a pressure that is detected by the in-cylinder pressure sensor prior to calculating the ratio of in-cylinder pressures.

In a seventh aspect of the present invention, the control apparatus for an internal combustion engine further comprising startup injection means that performs fuel injection when starting the internal combustion engine based on a crank angle that is detected by the crank angle detection means.

Advantageous Effects of Invention

According to the first invention, a relation between a ratio of in-cylinder pressures and a crank angle can be previously set in data means. As a result, crank angle detection means can detect (specify) a crank angle based on at least a ratio of in-cylinder pressures and the data means, and can complete the detection operation earlier than the conventional cylinder discrimination operation. Accordingly, when cranking the internal combustion engine, fuel injection and ignition and the like that are performed based on the specified crank angle can be started swiftly. It is thereby possible to improve the startability of the internal combustion engine and exhaust emissions at startup. Further, the cranking time can be shortened and the power consumption of the battery can be suppressed.

In addition, according to the first invention, since a ratio of in-cylinder pressures is used when detecting a crank angle, a gain included in a detection value of an in-cylinder pressure can be easily removed when calculating the ratio (when executing division). Accordingly, even if the gain fluctuates due to deterioration of an in-cylinder pressure sensor or changes in the usage environment, the crank angle can be accurately detected based on a ratio that is not influenced by the gain, and it is possible to prevent an error occurring in the detection result. Furthermore, since the data means is used, the crank angle can be easily calculated by processing that has a low computational load that only refers to the data means based on the ratio of in-cylinder pressures. More specifically, since processing that has a high computational load such as an exponential operation is not required when detecting a crank angle, the computational load can be suppressed, and thus the cost of the control apparatus can be reduced and the power consumption can be decreased.

According to the second invention, utilizing a fact that the ratio of in-cylinder pressures is equal to a volume ratio parameter $(V_n^{\kappa}/V_{n+1}^{\kappa})$ or $(V_{n+1}^{\kappa}/V_n^{\kappa})$, a relation between a volume ratio parameter and a crank angle, that is, a relation between a ratio of in-cylinder pressures and a crank angle, can be expressed in a data format in advance. In this case, a relation between a volume ratio parameter and a crank angle can be easily ascertained based on the structure of the internal combustion engine. Therefore, even without performing exponential operations such as $V_n^{\kappa}$, the control apparatus can easily calculate a crank angle based on a ratio of in-cylinder pressures and the data means.

According to the third invention, during a totally-closed period from when the intake valve closes until the exhaust valve opens, a correlation between the ratio of in-cylinder pressures and the volume ratio parameter is particularly high.

Therefore, by detecting the crank angle based on the ratio of in-cylinder pressures with respect to a cylinder that is in the totally-closed period, the detection accuracy can be enhanced.

According to the fourth invention, a ratio of in-cylinder pressures is a peak value at one location during a compression stroke of a single combustion cycle. Therefore, even before detecting a crank angle, in a case where a cylinder in which a peak value has appeared is detected, it can be determined that the cylinder in question is in a totally-closed period (more accurately, is in a compression stroke), and processing to detect the crank angle for the cylinder in question can be performed.

According to the fifth invention, even in a section in which a ratio of in-cylinder pressures (or volume ratio parameter) and a crank angle do not correspond one-to-one, the ratio of in-cylinder pressures (or volume ratio parameter) and the crank angle can be made to correspond one-to-one by taking into account an increasing or decreasing trend of the in-cylinder pressure. Thus, the crank angle detection means can accurately detect a crank angle in an arbitrary section by also using an increasing or decreasing trend of the in-cylinder pressure and not only the ratio of in-cylinder pressures and the data means.

According to the sixth invention, offset removal means can remove an offset included in a detected value for an in-cylinder pressure prior to calculating a ratio of in-cylinder pressures. Therefore, since the ratio of in-cylinder pressures becomes a parameter that is unaffected by both a gain and an offset included in a detected pressure, the precision with respect to detecting the crank angle can be further enhanced.

According to the seventh invention, since a crank angle can be detected swiftly and accurately by the first invention, start-up injection means can begin fuel injection at startup at an early stage at an appropriate timing based on the crank angle. Thus, the startability of the internal combustion engine and exhaust emissions at startup can be improved.

DESCRIPTION OF EMBODIMENT

Embodiment 1

[Configuration of Embodiment 1]

Figure 1:
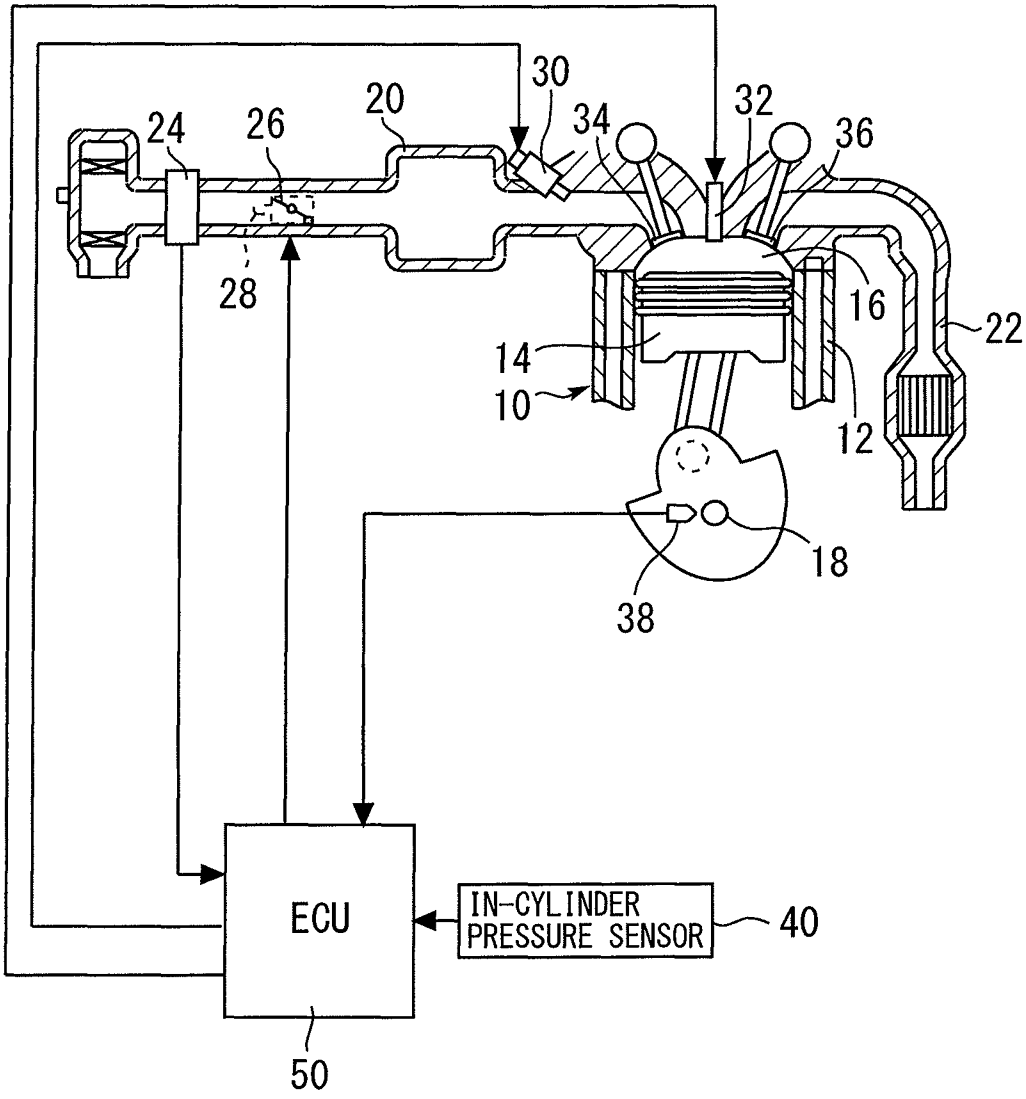
FIG. 1 is an overall configuration diagram for describing the system configuration of Embodiment 1 of the present invention.

Hereunder, Embodiment 1 of the present invention is described while referring to FIGS. 1 to 5. FIG. 1 is an overall configuration diagram for describing the system configuration of Embodiment 1 of the present invention. The system of the present embodiment includes a multi-cylinder internal combustion engine 10. A combustion chamber 16 that is expanded and contracted by a reciprocating operation of a piston 14 is provided in each cylinder 12 (only one cylinder is shown in the drawing) of the internal combustion engine 10. The piston 14 is connected to a crankshaft 18 of the internal combustion engine 10.

The internal combustion engine 10 also includes an intake passage 20 that draws intake air into each cylinder, and an exhaust passage 22 through which exhaust gas is discharged from each cylinder 12. An airflow meter 24 that detects an intake air amount and an electronically controlled throttle valve 26 are provided in the intake passage 20. The throttle valve 26 is controlled by a throttle motor 28 based on a degree of accelerator opening or the like, and increases or decreases an intake air amount. Each cylinder 12 is provided with a fuel injection valve 30 that injects fuel into an intake port, a spark plug 32 that ignites an air-fuel mixture in the combustion chamber 16, an intake valve 34 that opens and closes the intake passage 20 with respect to the combustion chamber 16, and an exhaust valve 36 that opens and closes the exhaust passage 22 with respect to the combustion chamber 16.

The system according to the present embodiment includes a sensor system that includes a crank angle sensor 38 and an in-cylinder pressure sensor 40 and the like, and an ECU (Electronic Control Unit) 50 that controls the operating state of the internal combustion engine 10. The crank angle sensor 38 constitutes rotation angle detection means of the present embodiment, and, for example, outputs one pulse signal each time the crankshaft 18 rotates by 1° CA. The ECU 50 can detect an angle (relative rotational angle) by which the crankshaft 18 has rotated based on the pulse signal. The sensor system also includes a cam angle sensor (not shown) that outputs a signal in accordance with a rotational angle of a camshaft. The cam angle sensor and the crank angle sensor 38 are commonly known sensors. By comparing an output signal of the crank angle sensor 38 and an output signal of the cam angle sensor, the ECU 50 can determine an absolute angle value of a crank angle and perform cylinder discrimination on the basis of a time point at which a predetermined combination of signal patterns appeared.

The in-cylinder pressure sensor 40 is constituted by a common pressure sensor that uses a piezoelectric element or a strain gauge or the like, and detects a pressure inside the combustion chamber 16 (in-cylinder pressure). In this connection, according to the present embodiment an example is described in which the in-cylinder pressure sensor 40 is provided in each cylinder 12 of the internal combustion engine. However, the present invention is not limited thereto, and it is sufficient to provide the in-cylinder pressure sensor 40 in at least one cylinder, and the number of in-cylinder pressure sensors 40 is not limited by the present embodiment. The ECU 50 also has a function that detects in-cylinder pressures at an arbitrary crank angle θ by means of the in-cylinder pressure sensor 40, and stores the detection results as time series data $P_n$ (n=1, 2, 3, . . . ).

In addition to the aforementioned sensors 38 and 40 and the airflow meter 24, the sensor system also includes various sensors that are required for control of the vehicle and the internal combustion engine (for example, a water temperature sensor that detects the temperature of cooling water of the internal combustion engine, an intake air pressure sensor that detects the pressure in the intake passage 20, a degree of accelerator opening sensor that detects the degree of accelerator opening, and an air-fuel ratio sensor that detects the air-fuel ratio of exhaust gas). These sensors are connected to an input side of the ECU 50. Further, various actuators including the throttle motor 28, the fuel injection valve 30, and the spark plug 32 are connected to an output side of the ECU 50. The ECU 50 drives each actuator while detecting the operating state of the internal combustion engine by means of the sensor system. More specifically, the ECU 50 sets an injection amount of fuel as well as a fuel injection timing and an ignition timing based on the output of the sensor system, and drives each actuator in accordance with the setting contents. The ECU 50 also executes startup control that is described below.

[Features of Embodiment 1]

Startup control is executed prior to performing cylinder discrimination based on signals of the crank angle sensor and the cam angle sensor when starting up (cranking) the internal combustion engine. The startup control is configured to detect an absolute rotational angle (crank angle) of the crankshaft 18 based on an in-cylinder pressure and distinguish a cylinder that is in an intake stroke from other cylinders.

Figure 2:
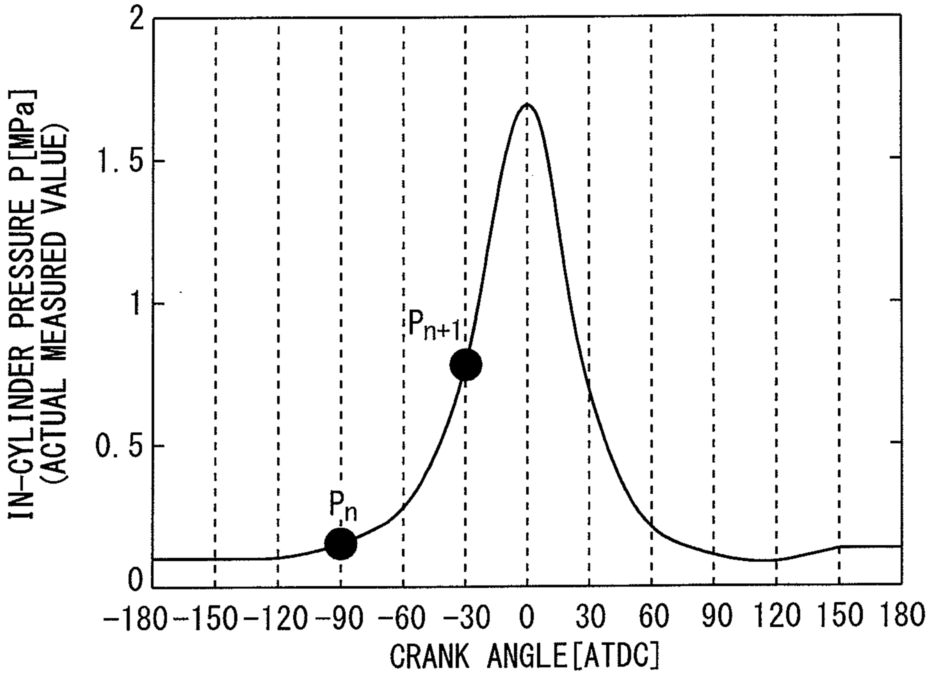
FIG. 2 is a characteristics diagram that illustrates a relation between a crank angle and an in-cylinder pressure in the internal combustion engine.
Figure 3:
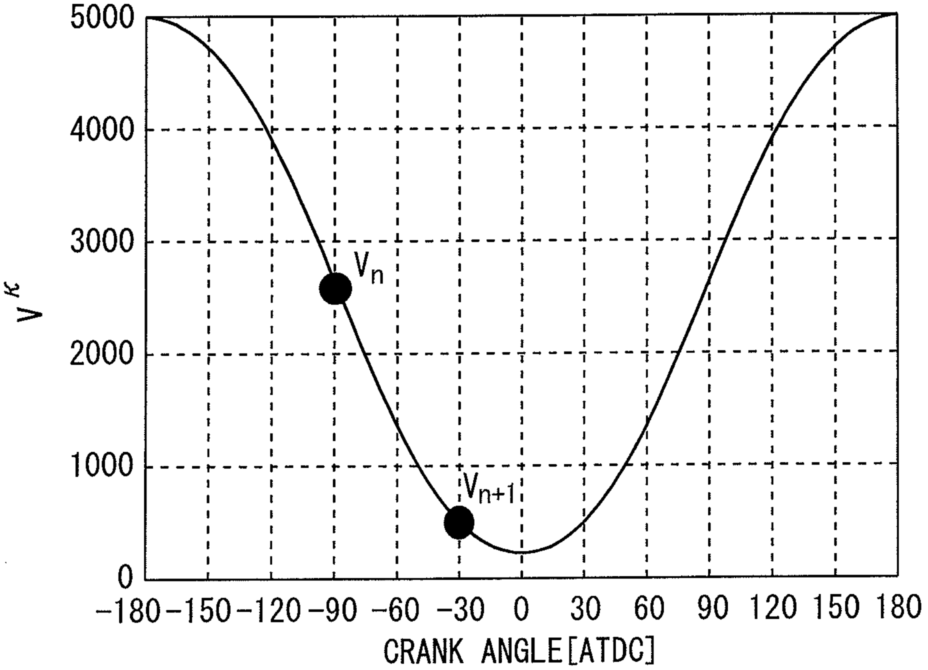
FIG. 3 is a characteristics diagram that illustrates a relation between a crank angle and $V^{\kappa}$.

First, the principles of detecting a crank angle using in-cylinder pressures are described. FIG. 2 is a characteristics diagram that illustrates a relation between a crank angle and an in-cylinder pressure in the internal combustion engine. FIG. 3 is a characteristics diagram that illustrates a relation between a crank angle and $V^{\kappa}$. In this case, if it is assumed that changes in the pressure and volume in a cylinder are adiabatic changes, a relation shown by the following equation (2) is established between an in-cylinder pressure P and an in-cylinder volume V. Note that in this equation, κ represents a specific heat ratio and α is a fixed constant.

$$PV^{\kappa}=\alpha \qquad (2)$$

Accordingly, in FIG. 2 and FIG. 3, a relation shown by the following equation (3) is established between an in-cylinder pressure $P_n$ and an in-cylinder volume $V_n$ at an arbitrary crank angle $\theta_n$ and an in-cylinder pressure $P_{n+1}$ and an in-cylinder volume $V_{n+1}$ at a crank angle $\theta_{n+1}$ to which the crankshaft has been rotated by a predetermined angle $\Delta\theta$ from the crank angle $\theta_n$. Further, the following equation (4) can be obtained by transforming the equation (3). Note that, in the description hereunder, $(V_n^{\kappa}/V_{n+1}^{\kappa})$ is referred to as a "volume ratio parameter".

$$P_nV_n^{\kappa}=P_{n+1}V_{n+1}^{\kappa}=\alpha \qquad (3)$$

$$P_{n+1}/P_n=V_n^{\kappa}/V_{n+1}^{\kappa} \qquad (4)$$

Figure 4:
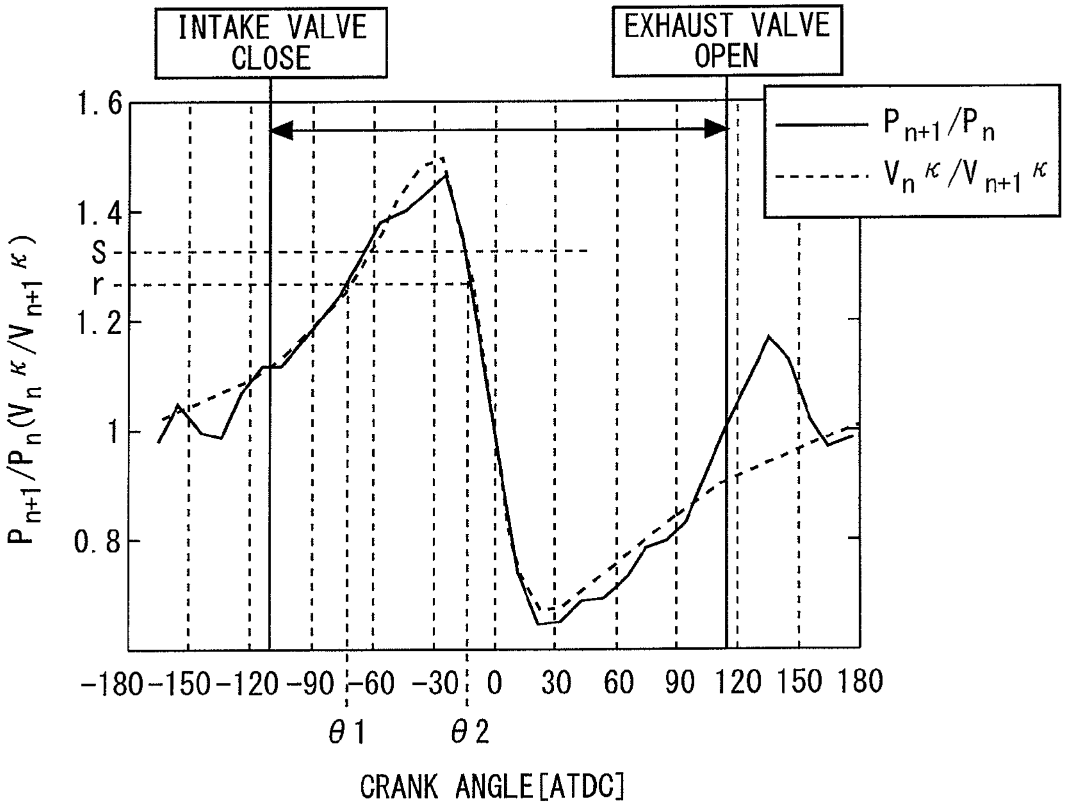
FIG. 4 is a characteristics diagram illustrates the relation between an in-cylinder pressure ratio, the volume ratio parameter, and the crank angle in the internal combustion engine.

FIG. 4 is a characteristics diagram obtained by experimentally verifying the relation expressed in the above equation (4), and illustrates the relation between a ratio of in-cylinder pressures (hereunder, referred to as "in-cylinder pressure ratio"), the volume ratio parameter, and the crank angle in the internal combustion engine. As shown in FIG. 4, there is a high correlation between the in-cylinder pressure ratio $(P_{n+1}/P_n)$ and the volume ratio parameter $(V_n^{\kappa}/V_{n+1}^{\kappa})$. In particular, it is found that the in-cylinder pressure ratio $(P_{n+1}/P_n)$ and the volume ratio parameter $(V_n^{\kappa}/V_{n+1}^{\kappa})$ are almost matching during a period from a compression stroke to an expansion stroke in which the inside of the cylinder is hermetically sealed, that is, during a totally-closed period from when the intake valve 34 closes until the exhaust valve 36 opens.

On the other hand, as shown by a dashed line in FIG. 4, there is a constant relation that is defined in accordance with the shape and size of the combustion chamber 16 and the like between the volume ratio parameter $(V_n^{\kappa}/V_{n+1}^{\kappa})$ and the crank angle $\theta_n$, and this relation can be determined in advance by calculation. Therefore, if the relation between the volume ratio parameter $(V_n^{\kappa}/V_{n+1}^{\kappa})$ and the crank angle $\theta_n$ is previously held as map data or the like, taking the relation shown in the above equation (4) as a premise, the ECU 50 can detect an absolute angle value of an arbitrary crank angle $\theta_n$ based on the in-cylinder pressure ratio $(P_{n+1}/P_n)$ and the map data. The startup control is configured to perform the following processing based on this detection principle.

(Calculation of In-Cylinder Pressure Ratio)

First, based on the output of the in-cylinder pressure sensor 40, the ECU 50 detects a first in-cylinder pressure $P_n$ at an arbitrary crank angle $\theta_n$ and a second in-cylinder pressure $P_{n+1}$ at a crank angle $\theta_{n+1}$ to which the crankshaft has been rotated by a predetermined angle $\Delta\theta$ from the crank angle $\theta_n$, and calculates the in-cylinder pressure ratio $(P_{n+1}/P_n)$. In this case, if the predetermined angle $\Delta\theta$ is excessively small, a difference between the in-cylinder pressures $P_n$ and $P_{n+1}$ is small and the calculation accuracy with respect to the in-cylinder pressure ratio decreases. Further, if the predetermined angle $\Delta\theta$ is excessively large, the time required to calculate the in-cylinder pressure ratio $(P_{n+1}/P_n)$ increases and hence the control responsiveness decreases.

Therefore, the predetermined angle $\Delta\theta$ is set to an appropriate value that achieves both calculation accuracy with respect to the in-cylinder pressure ratio and responsiveness in a compatible manner by, for example, taking into account a speed (slope of the characteristic line) at which the in-cylinder pressure ratio $(P_{n+1}/P_n)$ shown in FIG. 4 changes. In this connection, in FIG. 2 and FIG. 3, an example is illustrated of a case where the predetermined angle $\Delta\theta$ is set to 60° CA. Since the predetermined angle $\Delta\theta$ is a relative angle between the crank angles $\theta_n$ and $\theta_{n+1}$, the predetermined angle $\Delta\theta$ can be measured based on a signal from the crank angle sensor 38.

Prior to calculating the in-cylinder pressure ratio $(P_{n+1}/P_n)$ an offset b that is included in a detected pressure is acquired by one of methods (1) to (3) that are described later or the like. The in-cylinder pressure ratio $(P_{n+1}/P_n)$ is calculated after removing the offset b from the detected pressures. Further, a gain a that is included in a detected pressure is removed by performing division between $P_{n+1}$ and $P_n$ when calculating the in-cylinder pressure ratio. Note that the gain a and the offset b are defined by the foregoing equation (1). Accordingly, the in-cylinder pressure ratio $(P_{n+1}/P_n)$ is calculated as a parameter that is not influenced by the gain a and the offset b.

(Acquisition and Removal of Offset)

Acquisition and removal of the offset b is performed by methods (1) to (3) that are exemplified hereunder. These methods are commonly known. However, the present invention is not limited to these methods.

(1) A detection value of the in-cylinder pressure at top dead center after an exhaust stroke is regarded as being equal to atmospheric pressure that is already known, and the offset b is calculated by comparing the detection value of the relevant in-cylinder pressure with the atmospheric pressure that has been stored in advance.

(2) A detection value of the in-cylinder pressure in an intake stroke is regarded as being equal to an intake pipe pressure, and the offset b is calculated by comparing the detection value of the relevant in-cylinder pressure with an intake pipe pressure that is detected by an intake air pressure sensor.

(3) For example, as described in Japanese Patent Laid-Open No. 11-82148, by using a relation that $PV^{\kappa}$=constant, the offset b is removed based on an in-cylinder pressure P and an in-cylinder volume V that are obtained at a plurality of crank angles.

(Reference to Map Data)

The in-cylinder pressure ratio ($P_{n+1}/P_n$) calculated in this manner is compared with map data for a volume ratio parameter ($V_n^{\kappa}/V_{n+1}^{\kappa}$). Map data in which the relation between the volume ratio parameter ($V_n^{\kappa}/V_{n+1}^{\kappa}$) and the crank angle $\theta_n$ is expressed in a data format is previously stored in the ECU 50 (illustrated by the dashed line in FIG. 4). This map data constitutes data means of the present embodiment. When the relation expressed by the foregoing equation (4) is taken as a premise, the map data corresponds to data that expresses the relation between the in-cylinder pressure ratio ($P_{n+1}/P_n$) and the crank angle $\theta_n$ in a data format.

Accordingly, by referring to the map data based on the in-cylinder pressure ratio ($P_{n+1}/P_n$) with respect to an arbitrary crank angle $\theta_n$, the ECU 50 can detect the absolute angle value of the relevant crank angle $\theta_n$. Thus, according to the present embodiment, the relation between the in-cylinder pressure ratio ($P_{n+1}/P_n$) and the crank angle $\theta_n$ is previously set as map data. Therefore, when detecting a crank angle, for example, since it is not necessary to repeatedly perform processing to calculate $V_n^{\kappa}$ or $V_{n+1}^{\kappa}$ that includes exponential operations as in the conventional technology described in Patent Literature 4, the computational load of the ECU 50 can be suppressed to a minimum.

Note that, in the above described map data there is a section in which two crank angles correspond to a specific in-cylinder pressure ratio ($P_{n+1}/P_n$). More specifically, for example, when the map data is referred to on the basis of an in-cylinder pressure ratio r shown in FIG. 4, that are two crank angles θ1 and θ2 that correspond thereto. For such a section, the ECU 50 specifies which of the crank angles θ1 and θ2 is the crank angle to be detected based on an increasing or decreasing trend (slope of the characteristic line) of the relevant in-cylinder pressure at a time point at which the in-cylinder pressure $P_n$ or $P_{n+1}$ is detected.

More specifically, by means of the map data, the ECU 50 can distinguish whether the in-cylinder pressure is in an increasing trend or a decreasing trend at the respective positions of the crank angles θ1 and θ2. Accordingly, for example, by comparing an increasing or decreasing trend of the in-cylinder pressure at the time point at which the in-cylinder pressure $P_n$ or $P_{n+1}$ is detected and an increasing or decreasing characteristic of the in-cylinder pressure at the crank angles θ1 and θ2 on the map data, the ECU 50 can identify which of the crank angles θ1 and θ2 the in-cylinder pressure ratio ($P_{n+1}/P_n$) corresponds to.

Further, as described above, a correlation between the in-cylinder pressure ratio ($P_{n+1}/P_n$) and the volume ratio parameter ($V_n^{\kappa}/V_{n+1}^{\kappa}$) is particularly high during a totally-closed period in which the inside of the cylinder is hermetically sealed. Therefore, it is preferable to perform detection of a crank angle by means of the map data with a cylinder that is in the totally-closed period. Therefore, with respect to each cylinder, the ECU 50 determines whether or not the in-cylinder pressure ratio ($P_{n+1}/P_n$) has exceeded a predetermined standard value S. When a cylinder exists for which the in-cylinder pressure ratio ($P_{n+1}/P_n$) exceeds the standard value S, the ECU 53 determines that the cylinder is in a totally-closed period, and performs processing to detect the crank angle based on the in-cylinder pressure ratio ($P_{n+1}/P_n$) of the relevant cylinder.

In this case, as shown in FIG. 4, the in-cylinder pressure ratio ($P_{n+1}/P_n$) is a peak value at one location during a compression stroke of a single combustion cycle. The standard value S is previously set as a value that enables detection of the peak value. Accordingly, for example, when the in-cylinder pressure ratio ($P_{n+1}/P_n$) at any one cylinder among a plurality of cylinders exceeds the standard value S during cranking, the ECU 50 detects an angle value of the crank angle by the above described method based on the in-cylinder pressure ratio ($P_{n+1}/P_n$) of the relevant cylinder. Based on the detected crank angle, the ECU 50 sets the timing to start fuel injection with respect to each cylinder.

(Setting Fuel Injection Start Timing)

In the case of intake port injection, it is necessary to complete fuel injection before the intake valve closes. Therefore, according to the present embodiment, the fuel injection start timing is determined by calculating backwards from the timing at which the intake valve 34 closes. More specifically, first, the fuel injection amount (injection time period) is determined based on the state of the internal combustion engine (for example, the intake air temperature, the water temperature, and the battery voltage), and this injection time period is converted to an injection angle in accordance with a number of engine revolutions detected by the crank angle sensor 38. The fuel injection start timing is a crank angle obtained by subtracting the injection angle from an intake valve closing timing with respect to each cylinder, and is calculated for each cylinder.

Based on the crank angle detected by means of the in-cylinder pressure ratio ($P_{n+1}/P_n$), each time an injection start timing of any cylinder arrives, the ECU 50 starts fuel injection for the relevant cylinder. More specifically, a configuration is adopted is such that, with respect to a cylinder that is in a totally-closed period as described above, when the in-cylinder pressure ratio ($P_{n+1}/P_n$) matches the volume ratio parameter ($V_n^{\kappa}/V_{n+1}^{\kappa}$) that corresponds to the injection start timing of the specific cylinder, fuel injection of the specific cylinder is started.

[Specific Processing to Realize Embodiment 1]

Figure 5:
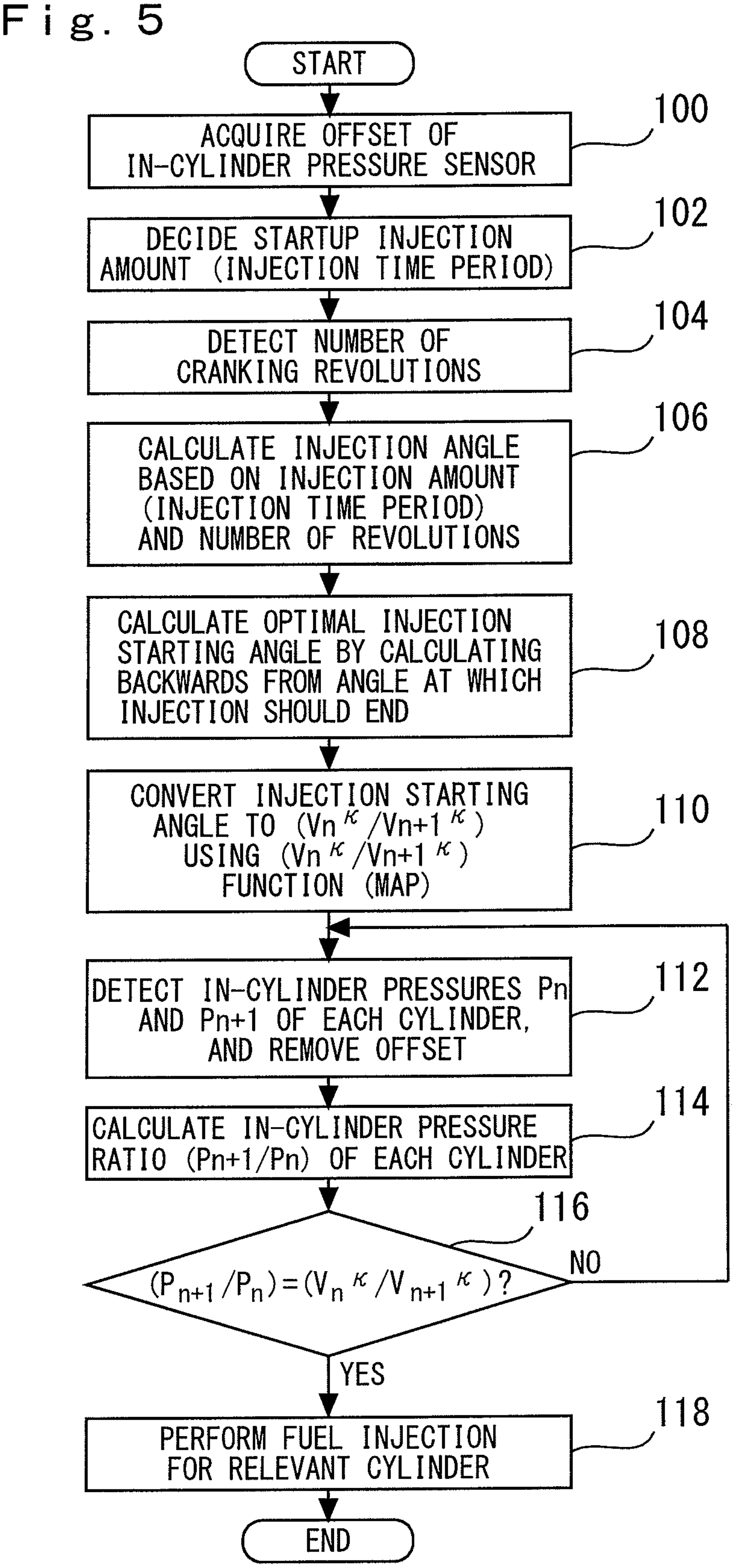
FIG. 5 is a flowchart that illustrates control executed by the ECU according to Embodiment 1 of the present invention.
Figure 6:
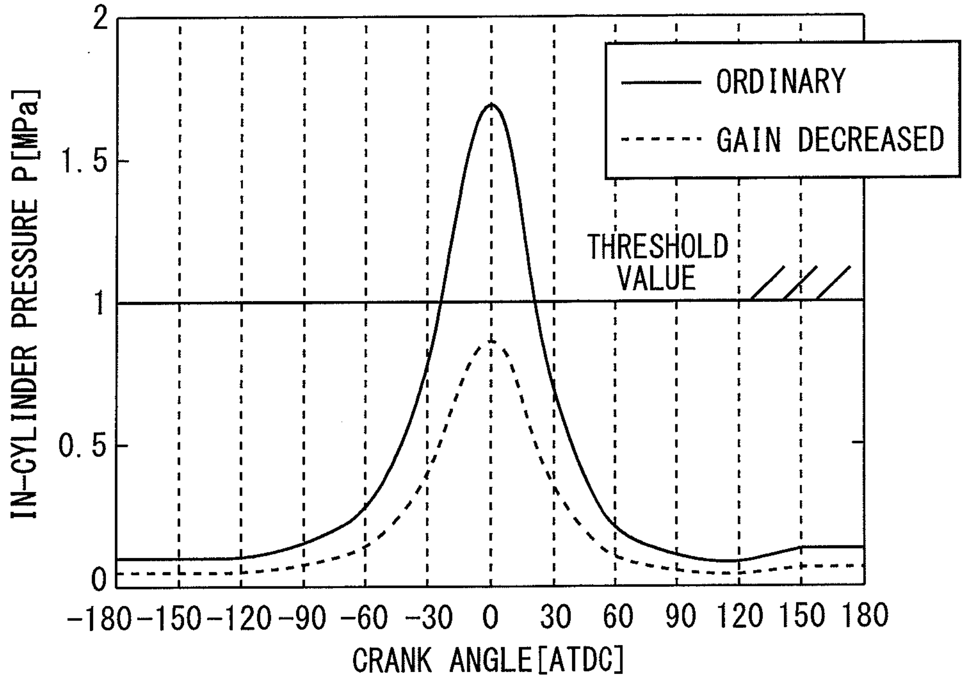
FIG. 6 is a characteristics diagram that illustrates output changes in a case where the gain of an in-cylinder pressure sensor decreases.
Figure 7:
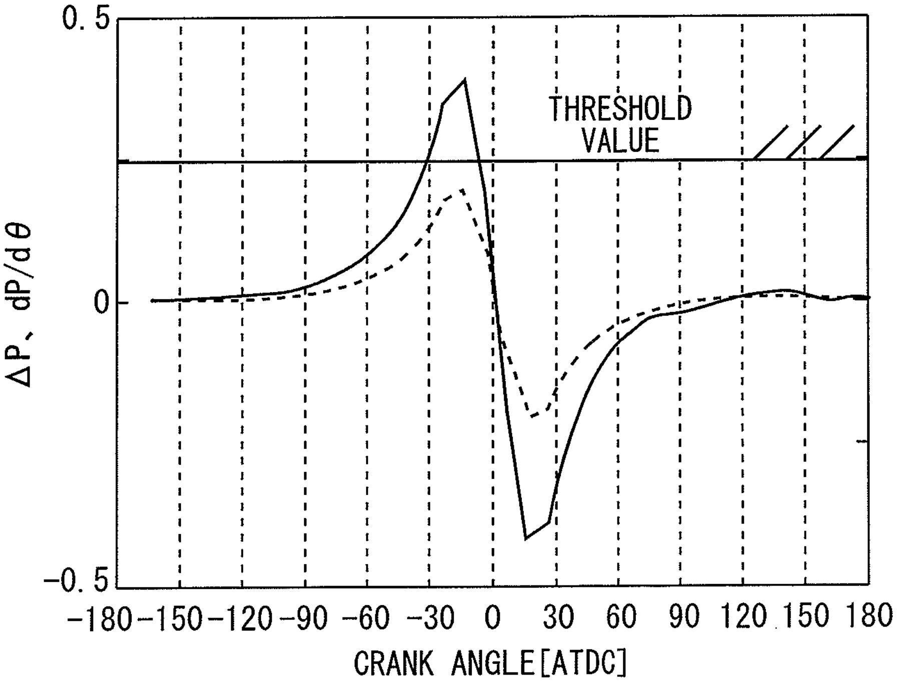
FIG. 7 is a characteristics diagram that illustrates changes in the parameters ($\Delta P$, $dP/d\theta$) in a case where the gain decreases.

FIG. 5 is a flowchart that illustrates control executed by the ECU according to Embodiment 1 of the present invention. The routine shown in FIG. 5 is repeatedly executed during a period from a time that the power of the ECU 50 is turned on when starting the internal combustion engine until cylinder discrimination is performed based on a signal of the crank angle sensor and the cam angle sensor, and ends at a time point at which the cylinder discrimination in question has been performed.

According to the routine shown in FIG. 5, first, that value of an offset b included in a pressure detected by the in-cylinder pressure sensor 40 is acquired (step 100). This acquisition processing is executed using, for example, any of the aforementioned methods (1) to (3). Next, at a time point at which cranking has started, the ECU 50 determines the fuel injection amount (injection time period) based on the intake air temperature, the water temperature, the battery voltage and the like (step 102). Further, the ECU 50 detects the number of revolutions at the time of cranking based on an output signal of the crank angle sensor 38 and converts the injection time period to an injection angle based on the detection result (steps 104 and 106).

Subsequently, by subtracting the injection angle from a valve closing timing (that is, a crank angle at which fuel injection should be ended) with respect to the intake valve 34 of each cylinder, the optimal injection starting angle is respectively calculated for each cylinder (step 108). Valve closing timings of the intake valve 34 of each cylinder during cranking are previously stored in the ECU 50. Accordingly, by subtracting the injection angle from these valve closing timings, an optimal injection starting angle can be obtained for each individual cylinder.

Next, using the map data shown in FIG. 4, the ECU 50 converts the injection starting angles to volume ratio parameters ($V_n^{\kappa}/V_{n+1}^{\kappa}$) (step 110). Thus, the injection starting angle of each cylinder is converted to a specific numerical value of the respective volume ratio parameters ($V_n^{\kappa}/V_{n+1}^{\kappa}$).

In the next processing, first the ECU 50 detects the in-cylinder pressures $P_n$ and $P_{n+1}$ in each cylinder, and removes the offset b obtained in the above described step 100 from the detection values (step 112). Subsequently, the ECU 50 calculates the in-cylinder pressure ratio ($P_{n+1}/P_n$) of each cylinder based on the in-cylinder pressure after the offset b has been removed (step 114). Subsequently, by comparing these in-cylinder pressure ratios with the standard value S, while distinguishing a cylinder that is in a totally-closed period from other cylinders, the ECU 50 determines whether or not the in-cylinder pressure ratio ($P_{n+1}/P_n$) of the relevant cylinder that is in the totally-closed period matches the volume ratio parameter ($V_n^{\kappa}/V_{n+1}^{\kappa}$) of any cylinder that has been determined in step 110 (step 116). If this determination is affirmative, since it means that a specific crank angle (injection starting angle of a certain cylinder) has been detected, the ECU 50 starts fuel injection for the relevant cylinder (step 118). In contrast, if the result determined in step 116 is negative, the processing of steps 112 to 116 is repeated until the determined result is affirmative.

As described above, according to the present embodiment, utilizing the fact that the in-cylinder pressure ratio ($P_{n+1}/P_n$) is equal to the volume ratio parameter ($V_n^{\kappa}/V_{n+1}^{\kappa}$), a relation between the volume ratio parameter and the crank angle, that is, a relation between the in-cylinder pressure ratio and the crank angle can be expressed in advance as map data. In this case, the relation between the volume ratio parameter and the crank angle can be easily determined based on the structure of the internal combustion engine. As a result, at a time of cranking, a crank angle can be detected (specified) based on at least the in-cylinder pressure ratio and the map data, and the detection operation can be completed earlier than the conventional cylinder discrimination operation that uses a crank angle sensor and a cam angle sensor.

More specifically, in contrast to the conventional cylinder discrimination operation that is completed after the crankshaft has rotated at least approximately 180 to 360°, according to the present embodiment, for example, in a four-cylinder engine, even at a time point at which the crankshaft has rotated approximately 45°, the crank angle can be specified. Therefore, at a time of cranking, fuel injection and ignition and the like that are performed based on the specified crank angle can be started swiftly. In particular, fuel injection, which significantly influences the startability, can be started at an early stage at an appropriate timing. It is thereby possible to enhance the startability of the internal combustion engine and improve exhaust emissions at startup. Further, the cranking time can be shortened and power consumption of the battery can be suppressed.

In addition, since an in-cylinder pressure ratio ($P_{n+1}/P_n$) is used when detecting the crank angle, the gain a included in a detection value of an in-cylinder pressure can be easily removed when calculating the in-cylinder pressure ratio (when executing division). Further, the offset b included in a detection value can be removed in advance prior to calculating the in-cylinder pressure ratio. Accordingly, since the in-cylinder pressure ratio becomes a parameter that is not influenced by either the gain a or the offset b, even if the gain a and the offset b fluctuate due to deterioration of the in-cylinder pressure sensor 40 or changes in the usage environment or the like, the crank angle can always be accurately detected, and it is possible to prevent an error occurring in the detection value thereof.

Further, according to the present embodiment, since map data is used, the crank angle be easily calculated by processing that has a low computational load that only refers to the map data based on the in-cylinder pressure ratio. More specifically, since the ECU 50 need not perform exponential operations which have a high computational load such as $V_n^{\kappa}$ when detecting a crank angle, the computational load can be suppressed, and thus the cost of the control apparatus can be reduced and the power consumption can be decreased.

Further, according to the present embodiment, since a crank angle is detected by utilizing a cylinder that is in a totally-closed period during which the correlation between the in-cylinder pressure ratio and the volume ratio parameter is particularly high, the detection precision can be enhanced still further. Moreover, since a cylinder whose in-cylinder pressure ratio exceeds the standard value S is determined as being in a totally-closed period, even prior to detecting a crank angle, if the in-cylinder pressure ratio of a certain cylinder exceeds the standard value S, it can be determined with certainty that the relevant cylinder is in a totally-closed period (more exactly, is in a compression stroke).

In addition, even in a section in which an in-cylinder pressure ratio (or volume ratio parameter) and a crank angle do not correspond one-to-one in the map data, the in-cylinder pressure ratio (or volume ratio parameter) and the crank angle can be made to correspond one-to-one by taking into consideration an increasing or decreasing trend of the in-cylinder pressure. Accordingly, the ECU 50 can accurately detect a crank angle in an arbitrary section by also using an increasing or decreasing trend of the in-cylinder pressure and not only the in-cylinder pressure ratio and the map data.

Note that, in the above described embodiment, step 114 in FIG. 5 shows a specific example of pressure ratio calculation means, and steps 110 and 116 show a specific example of crank angle detection means. Further, steps 110 and 112 show a specific example of offset removal means, and step 118 shows a specific example of startup injection means.

Further, according to the embodiment, a configuration using the map data shown in FIG. 4 is adopted as the data means. However, the present invention is not limited thereto and, for example, the data means may be a function expression in which the characteristic lines shown in FIG. 4 are converted into a mathematical expression or the like.

Furthermore, according to the embodiment, a configuration is adopted that, utilizing the fact that the in-cylinder pressure ratio ($P_{n+1}/P_n$) and the volume ratio parameter ($V_n^{\kappa}/V_{n+1}^{\kappa}$) are equal, expresses the relation between the volume ratio parameter ($V_n^{\kappa}/V_{n+1}^{\kappa}$) and the crank angle in a data format and uses the resulting data. However, the present invention is not limited thereto, and a configuration may also be adopted that simply determines the relation between the in-cylinder pressure ratio ($P_{n+1}/P_n$) and the crank angle by experiment or the like, and uses the thus-determined relation as the map data.

Further, although according to the embodiment a configuration is adopted that uses the relation between the in-cylinder pressure ratio ($P_{n+1}/P_n$) and the volume ratio parameter ($V_n^{\kappa}/V_{n+1}^{\kappa}$), according to the present invention a configuration may also be adopted that uses ($P_n/P_{n+1}$) and ($V_{n+1}^{\kappa}/V_n^{\kappa}$) that are the inverse of the aforementioned ratios as the in-cylinder pressure ratio and the volume ratio parameter.

According to the embodiment, a configuration is adopted that detects a crank angle based on the in-cylinder pressure ratio ($P_{n+1}/P_n$) of a cylinder that is in a totally-closed period. However, the present invention is not limited thereto, and a configuration may also be adopted that detects a crank angle based on an in-cylinder pressure ratio during a period other than a totally-closed period.

Further, according to the embodiment, a configuration is adopted in which, as shown in step 100 in FIG. 5, the offset b of the in-cylinder pressure sensor 40 is acquired each time cranking is performed. However, the present invention is not limited thereto, and a configuration may also be adopted that acquires the offset b at a timing that is different to that of the routine shown in FIG. 5 and stores the acquired value. More specifically, for example, a configuration may also be adopted that acquires the offset b when a fixed period has elapsed or when the temperature environment changes or the like. In addition, although according to the embodiment a configuration is adopted that removes the offset b from a pressure detected by the in-cylinder pressure sensor 40, according to the present invention an effect can be obtained even if only the gain a is removed, and the offset b need not be removed.

Furthermore, according to the embodiment, a configuration is adopted in which fuel injection is performed at startup based on a crank angle that is detected by means of the in-cylinder pressure ratio ($P_{n+1}/P_n$). However, the present invention is not limited thereto, and is also applicable to various kinds of control that use a crank angle. Specifically, for example, a configuration may also be adopted that sets an ignition timing based on a crank angle that is detected by means of the in-cylinder pressure ratio ($P_{n+1}/P_n$).

Further, although intake port injection of fuel has been taken as an example in the description of the present embodiment, the present invention is not limited thereto, and may also be applied to in-cylinder fuel injection. In the case of in-cylinder fuel injection, since it is sufficient to complete fuel injection before the ignition timing at startup, for example, the timing to start the injection of fuel may be determined by calculating backwards from the ignition timing of each cylinder.

Furthermore, although according to the embodiment a configuration is adopted in which the in-cylinder pressure sensor 40 is provided in each cylinder of the internal combustion engine 10, the present invention is not limited thereto, and it is sufficient that the in-cylinder pressure sensor is provided in at least one cylinder. More specifically, if the crank angle can be detected by means of the in-cylinder pressure ratio ($P_{n+1}/P_n$) with respect to at least one cylinder, an effect can be obtained that is substantially the same as the effect of Embodiment 1.

DESCRIPTION OF REFERENCE NUMERALS

10 internal combustion engine, 12 cylinder, 14 piston, 16 combustion chamber, 18 crankshaft, 20 intake passage, 22 exhaust passage, 24 airflow meter, 26 throttle valve, 28 throttle motor, 30 fuel injection valve, 32 spark plug, 34 intake valve, 36 exhaust valve, 38 crank angle sensor (rotation angle detection means), 40 in-cylinder pressure sensor, 50 ECU

The invention claimed is:

1. A control apparatus for an internal combustion engine, comprising:

an in-cylinder pressure sensor that is provided in at least one cylinder of an internal combustion engine, and that detects an in-cylinder pressure of the cylinder;

rotation angle detection means that detects an angle to which a crankshaft of the internal combustion engine is rotated;

pressure ratio calculation means that detects a first in-cylinder pressure that is an in-cylinder pressure at a time that the crankshaft is at an arbitrary crank angle and a second in-cylinder pressure that is an in-cylinder pressure when the crankshaft is at a crank angle reached by rotating by a predetermined angle from the arbitrary crank angle, and calculates a ratio between the first and second in-cylinder pressures;

data means that is previously set by expressing a relation between the ratio of in-cylinder pressures and the crank angle in a data format; and crank angle detection means that detects an angle value of the arbitrary crank angle based on at least the ratio of in-cylinder pressures and the data means, the data means is means that, utilizing a fact that a volume ratio parameter ($V_n^{\kappa}/V_{n+1}^{\kappa}$) or ($V_{n+1}^{\kappa}/V_n^{\kappa}$) that is calculated based on an in-cylinder volume $V_n$ at the arbitrary crank angle, an in-cylinder volume $V_{n+1}$ at the crank angle reached by rotating by a predetermined angle from the arbitrary crank angle, and a specific heat ratio $\kappa$ is equal to the ratio of in-cylinder pressures, expresses a relation between the volume ratio parameter and the crank angle in a data format.

2. The control apparatus for an internal combustion engine according to claim 1, wherein the crank angle detection means is configured to perform detection processing with respect to the crank angle by utilizing a cylinder that is in a totally-closed period that extends from a time that an intake valve closes until an exhaust valve opens.

3. The control apparatus for an internal combustion engine according to claim 2, wherein the crank angle detection means is configured to determine that the cylinder is in the totally-closed period when the ratio of in-cylinder pressures exceeds a predetermined standard value.

4. The control apparatus for an internal combustion engine according to claim 1, wherein the crank angle detection means is configured to perform detection processing with respect to the crank angle based on the ratio of in-cylinder pressures, the data means, and an increasing or decreasing trend of the in-cylinder pressure at a time point at which the first or second in-cylinder pressure is detected.

5. The control apparatus for an internal combustion engine according to claim 1, further comprising offset removal means that removes an offset included in a pressure that is detected by the in-cylinder pressure sensor prior to calculating the ratio of in-cylinder pressures.

6. The control apparatus for an internal combustion engine according to claim 1, further comprising startup injection means that performs fuel injection when starting the internal combustion engine based on a crank angle that is detected by the crank angle detection means.

* * * * *